(12) United States Patent
Herlitz et al.

(10) Patent No.: US 8,641,057 B2
(45) Date of Patent: Feb. 4, 2014

(54) WAGON

(75) Inventors: Todd Herlitz, Glenview, IL (US);
Thomas Schlegel, Wheaton, IL (US);
Eric Selner, Chicago, IL (US)

(73) Assignee: Radio Flyer Inc., Chicago, IL (US)

(*) Notice: Subject to any disclaimer, the term of this patent is extended or adjusted under 35 U.S.C. 154(b) by 0 days.

(21) Appl. No.: 13/406,818

(22) Filed: Feb. 28, 2012

(65) Prior Publication Data
US 2012/0248722 A1 Oct. 4, 2012

Related U.S. Application Data

(60) Provisional application No. 61/447,220, filed on Feb. 28, 2011.

(51) Int. Cl.
*B62B 1/12* (2006.01)

(52) U.S. Cl.
USPC .......... 280/47.18; 280/30; 280/1.13; 280/827

(58) Field of Classification Search
USPC ........ 280/827–828, 1.23, 7.1, 7.15, 647–648, 280/650–651, 655–658, 87.01, 87.021, 280/87.05, 47.18, 47.25, 47.38, 47.4
See application file for complete search history.

(56) References Cited

U.S. PATENT DOCUMENTS

| | | | | |
|---|---|---|---|---|
| 4,265,461 | A * | 5/1981 | Okubo | 280/1.13 |
| 5,480,180 | A | 1/1996 | Fuller et al. | |
| D369,629 | S | 5/1996 | Pasin et al. | |
| 5,529,323 | A | 6/1996 | vom Braucke et al. | |
| 5,538,267 | A | 7/1996 | Pasin et al. | |
| D382,309 | S | 8/1997 | Brown et al. | |
| D389,877 | S | 1/1998 | Pasin | |
| 5,957,482 | A | 9/1999 | Shorter | |
| D458,648 | S | 6/2002 | Chiappetta et al. | |
| 6,446,981 | B1 | 9/2002 | Wise et al. | |
| 6,601,860 | B2 | 8/2003 | Potter | |
| 6,641,149 | B2 | 11/2003 | Chiappetta et al. | |
| D547,391 | S | 7/2007 | Johnson et al. | |

FOREIGN PATENT DOCUMENTS

EP    1 847 437 A2    10/2007

OTHER PUBLICATIONS

Radio Flyer Pathfinder: Retrieved on Nov. 12, 2010 from: http://www.amazon.com/Radio-Flyer-Pathfinder-Wagon%C2%AE-Red/dp/B0000859QK%3FSubscriptionId%3DAKIAIQF34XORTUHI-VHHA%26tag%3Diowestpricesusa-20%26linkCode%3Dxm2%26camp%3D2025%26creative%3D165953%26creativeASIN%3DB0000859QK.
Step 2 Wagon: Retrieved on Nov. 12, 2010 from: http://www.littletikesplay.com/step2/step-2-wagon-for-two-plus-willow-green.html.

* cited by examiner

*Primary Examiner* — John Walters
*Assistant Examiner* — James Triggs
(74) *Attorney, Agent, or Firm* — McDermott Will & Emery LLP

(57) ABSTRACT

A wagon includes a wagon pan including a wagon pan sidewall and a footwell including a footwell sidewall and a bottom. The wagon pan and footwell are adapted to be shipped in a nesting configuration and fastened together with the wagon pan on top of the footwell to form a body of the wagon. A handle and a number of are wheels adapted to be connected to the body of the wagon. The handle and wheels may also be shipped in a nested configuration with respect to the footwell.

27 Claims, 13 Drawing Sheets

WAGON

CLAIM OF PRIORITY

This application claims priority from U.S. Provisional Patent Application Ser. No. 61/447,220, filed Feb. 28, 2011.

FIELD OF THE INVENTION AND BACKGROUND

The present invention relates to wagons and, more particularly, to the construction of a plastic wagon.

Wagons are popular with both children and parents. While children enjoy playing with wagons as toys, parents appreciate the utility offered by wagons and often use them to transport children and cargo.

A difficulty facing manufacturers and shippers of wagons is that the products are bulky and sometimes heavy. This causes packaging difficulties and increases the shipping costs for manufacturers. In addition, the products consume valuable inventory space for distributors and retailers. A need exists for a wagon that provides a compact profile when packaged, shipped and stored in inventory. A need also exists for such a wagon to be economical to construct, durable and lightweight.

DETAILED DESCRIPTION OF EMBODIMENTS

An embodiment of the wagon of the present invention is indicated in general at 20 in FIGS. 1-5. The wagon features a two-piece body, indicated in general at 21, which consists of an upper portion wagon pan 22 and a lower portion footwell 24 which are molded separately and then secured together with screws after shipping and unpacking. The wagon pan 22 is preferably rotationally molded from plastic, while the footwell 24 is preferably injection molded from plastic. Alternative materials, including, but not limited to, metal, may be used for either or both the wagon pan and footwell.

Figure 10:
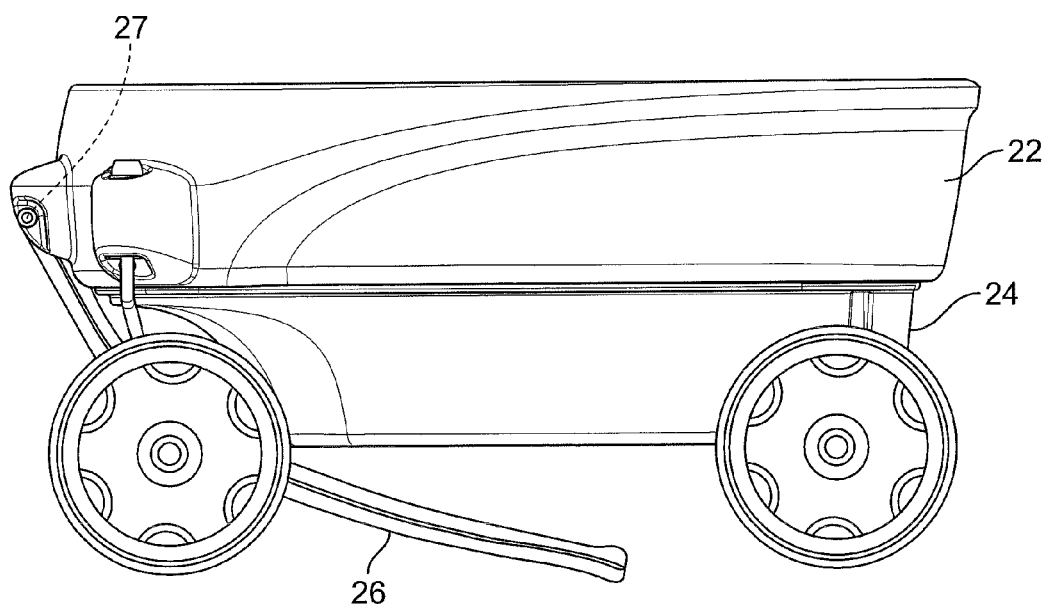
FIG. 10 is a side elevational view showing the wagon of FIGS. 1-5 with the handle in a storage position.

A handle 26 is pivotally attached to the front wall of the wagon pan by a pin 27 and handle mounting brackets 25a and 25b. Handle mounting brackets 25a and 25b are preferably molded into the front wall of the wagon pan, but may be separately produced and then attached. The handle pivots between an upright position, illustrated in FIGS. 1-5, and a storage position underneath the footwell 24, illustrated in FIG. 10.

Figure 1:
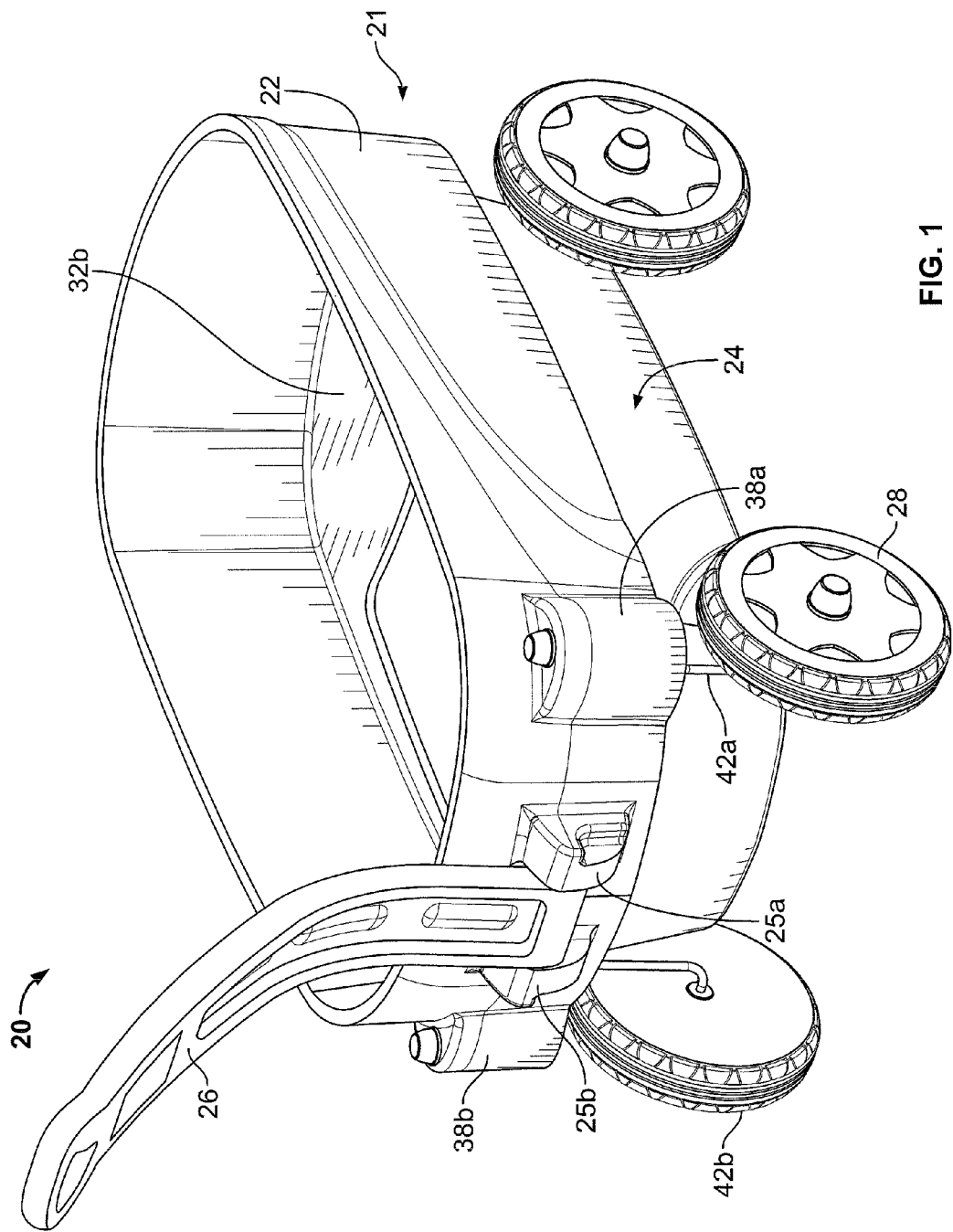
FIG. 1 is a top front perspective view of an embodiment of the wagon of the present invention.
Figure 2:
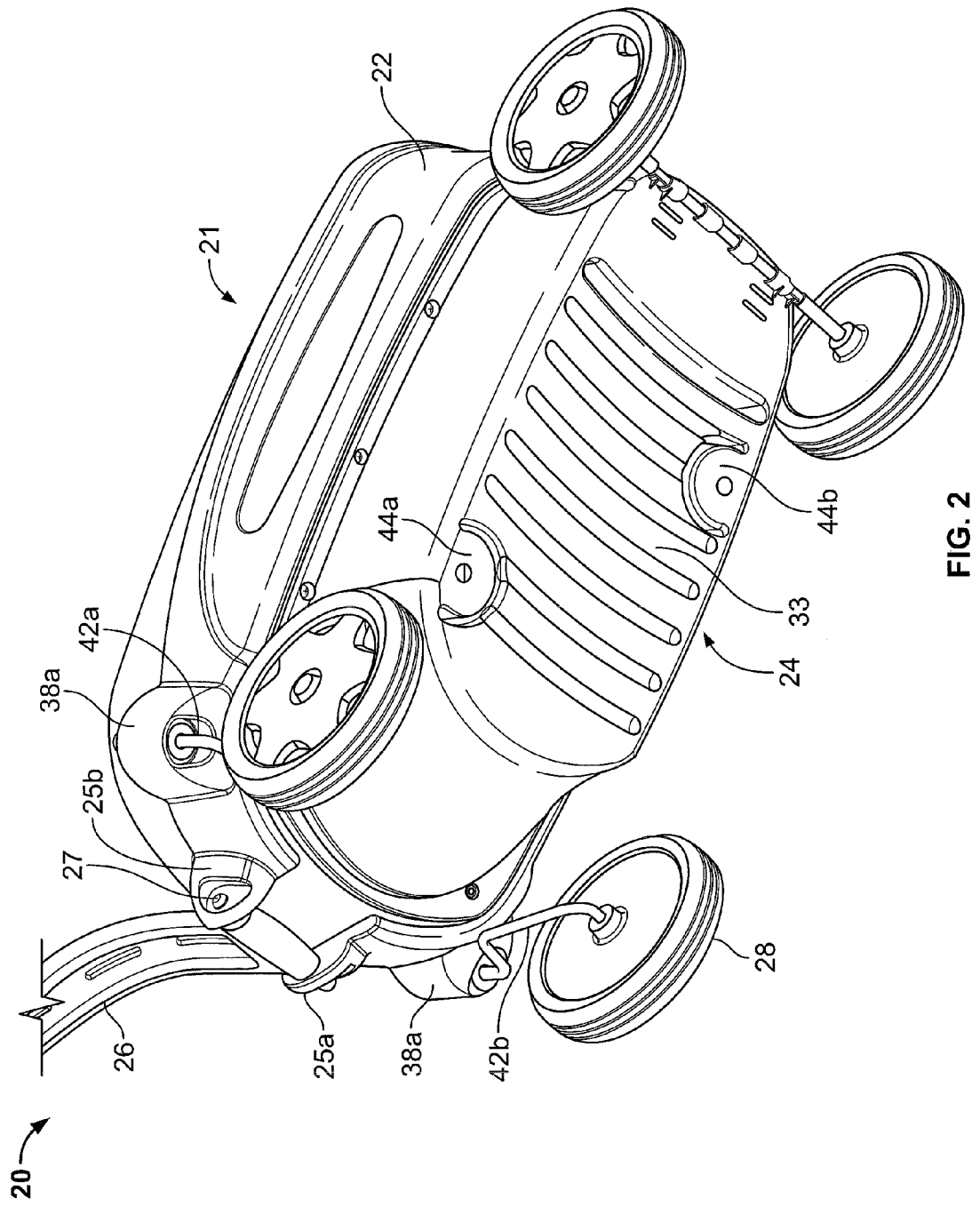
FIG. 2 is a bottom front perspective view of the wagon of FIG. 1.
Figure 3:
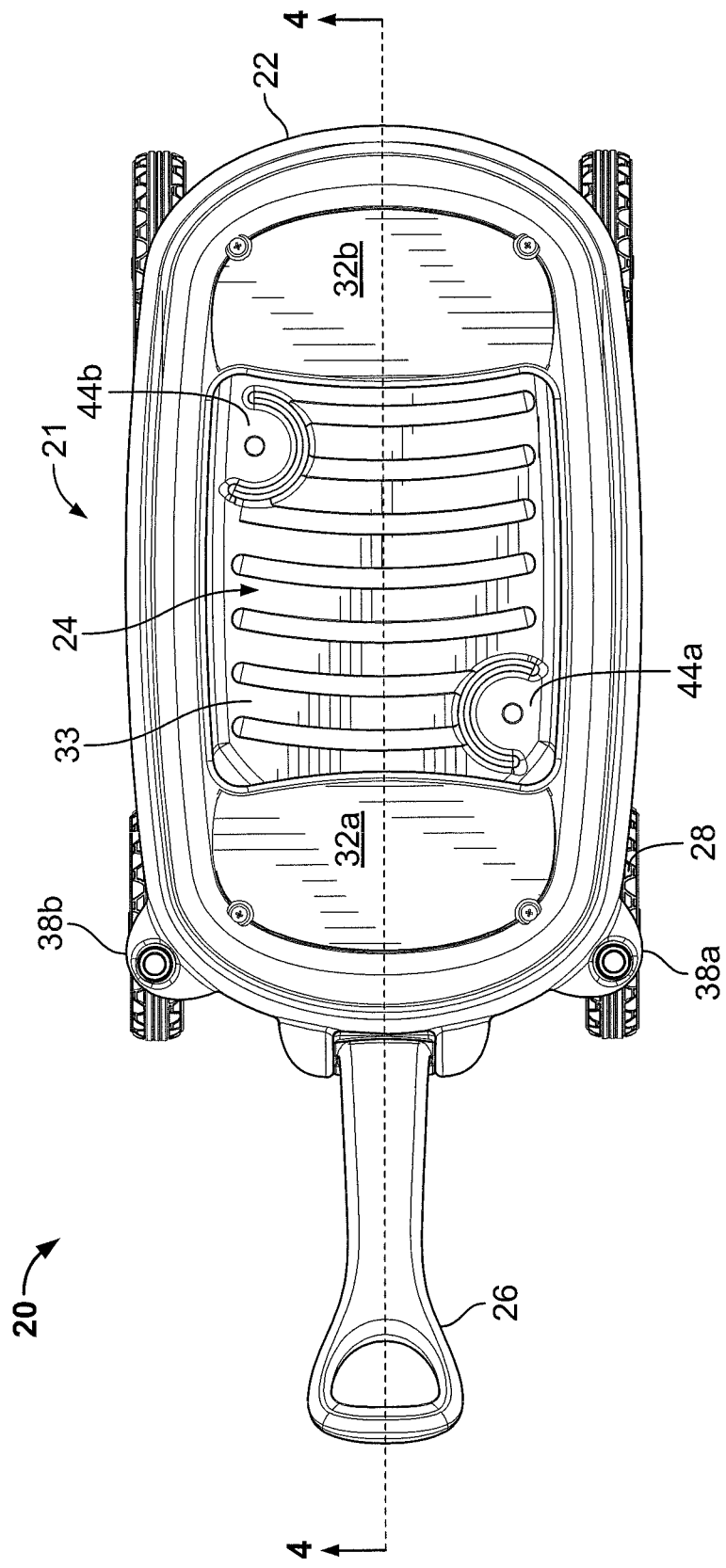
FIG. 3 is top plan view of the wagon of FIGS. 1 and 2.
Figure 4:
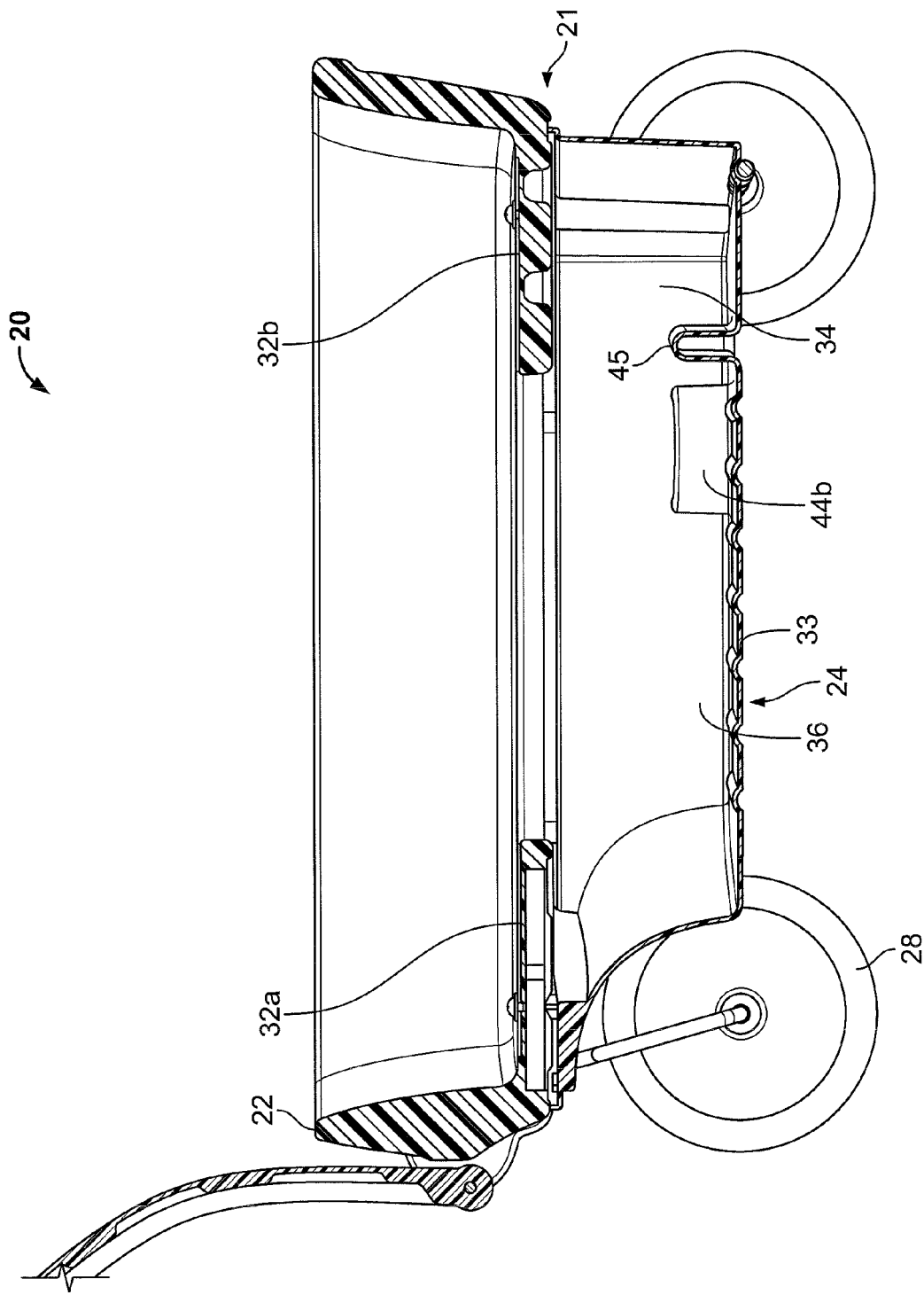
FIG. 4 is a sectional view of the wagon of FIGS. 1-3 taken along line 4-4 of FIG. 3.
Figure 5:
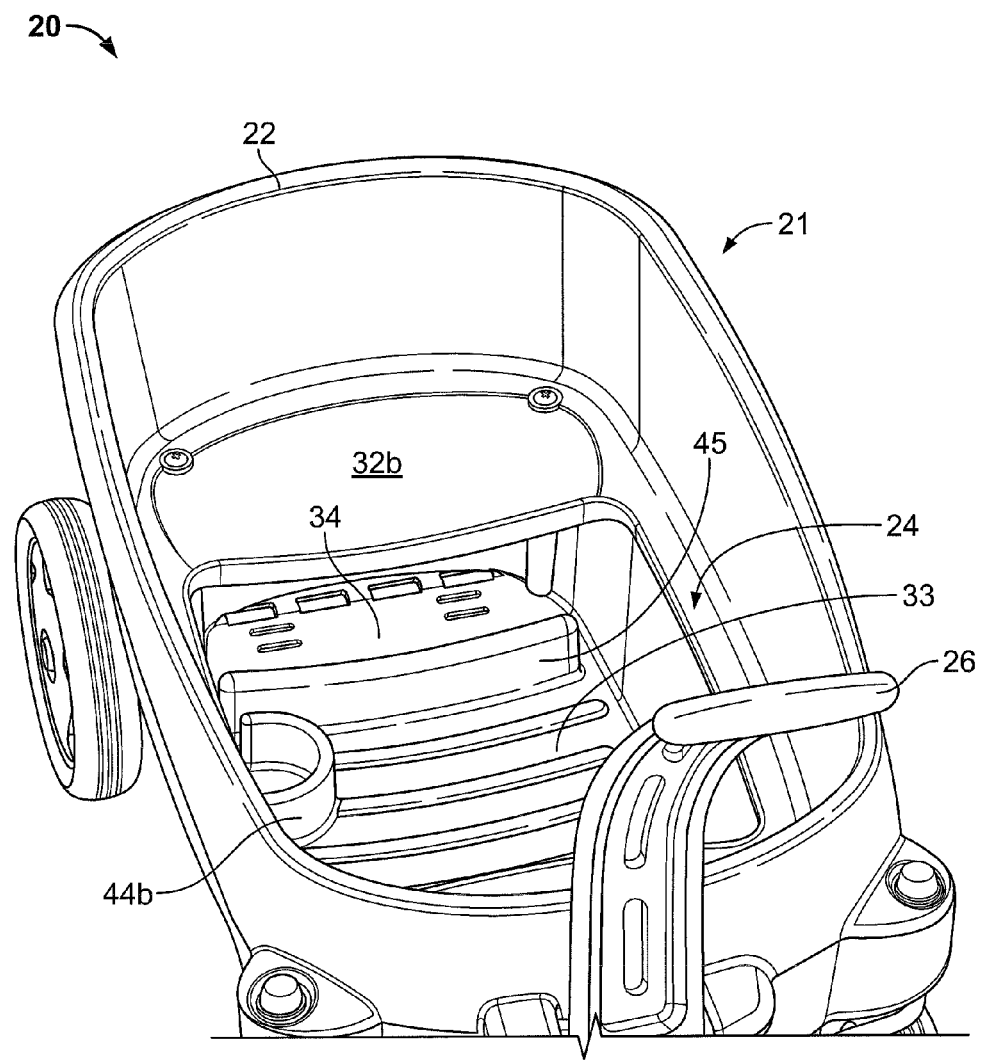
FIG. 5 is a top front partial perspective view showing the rear portion of the interior of the wagon of FIGS. 1-4.
Figure 7A:
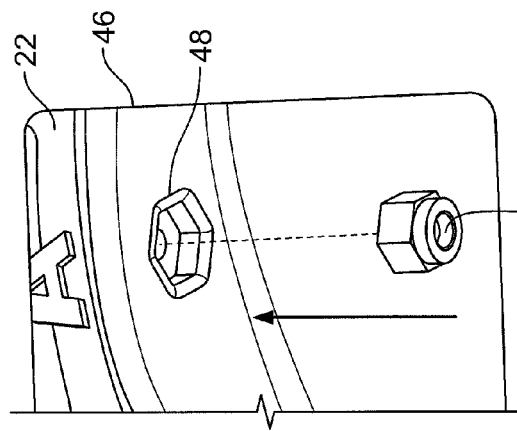
FIGS. 7A and 7B are enlarged bottom perspective views showing insertion of a nut into one of the nut recesses formed in the rim of the footwell of the body of the wagon of FIGS. 1-6.
Figure 7B:
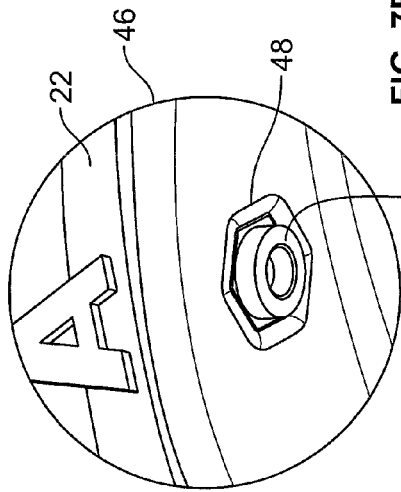

The wagon pan 22 features integrally molded front and rear walls and sidewalls as well as front and rear seat surfaces 32a and 32b. The top of the wagon pan is open as is the area between the front and rear seat surfaces. The wagon footwell features an integrally molded bottom 33 and front and rear walls and sidewalls. As illustrated in FIGS. 4 and 5, the assembled wagon provides a storage space 34 under the rear seat surface 32b. Furthermore, children riding in the wagon and seated on seat surfaces 32a and 32b may comfortably position their feet within the interior of foot well 24, indicated at 36 in FIG. 4.

It should be noted that in an alternative embodiment, the seating surfaces 32a and 32b could be omitted to provide the wagon with greater cargo hauling capacity.

The wagon features four wheels 28. A pair of caster mounts 38a and 38b (FIGS. 1-3) are preferably molded into the wagon pan 22 and support the front wheels via caster rods 42a and 42b so that the front wheels are free to pivot as the wagon is pulled by the handle 26. The caster mounts may alternatively be separately produced and then attached to the wagon pan.

As illustrated in FIGS. 2-5, a pair of cup holders 44a and 44b are preferably molded into the bottom 33 of the footwell 24. In addition, a barrier wall, illustrated at 45 in FIGS. 4 and 5 is preferably molded into the floor of the footwell to assist in securing items in storage space 34 under rear seat surface 32b.

Figure 6:
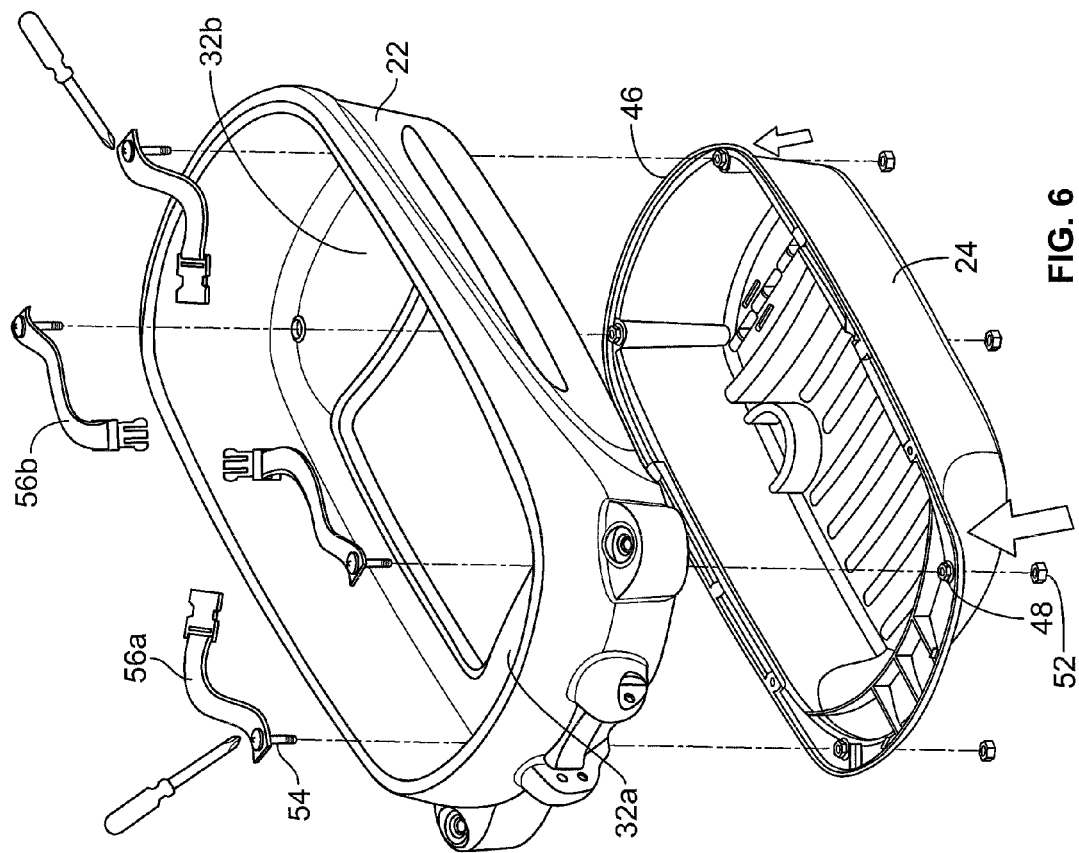
FIG. 6 is an exploded perspective view of the body of the wagon of FIGS. 1-5.

Assembly of the wagon pan 22 and footwell 24 to form the wagon body is illustrated in FIGS. 6-9. As illustrated in FIG. 6, the footwell 24 features a circumferential rim portion 46 which features molded nut recesses 48. As illustrated in FIGS. 6, 7A and 7B, each nut recess 48 receives a nut 52. While four nut recesses are illustrated, an alternative number of nut recesses, nuts and corresponding screws may be used.

Figure 8:
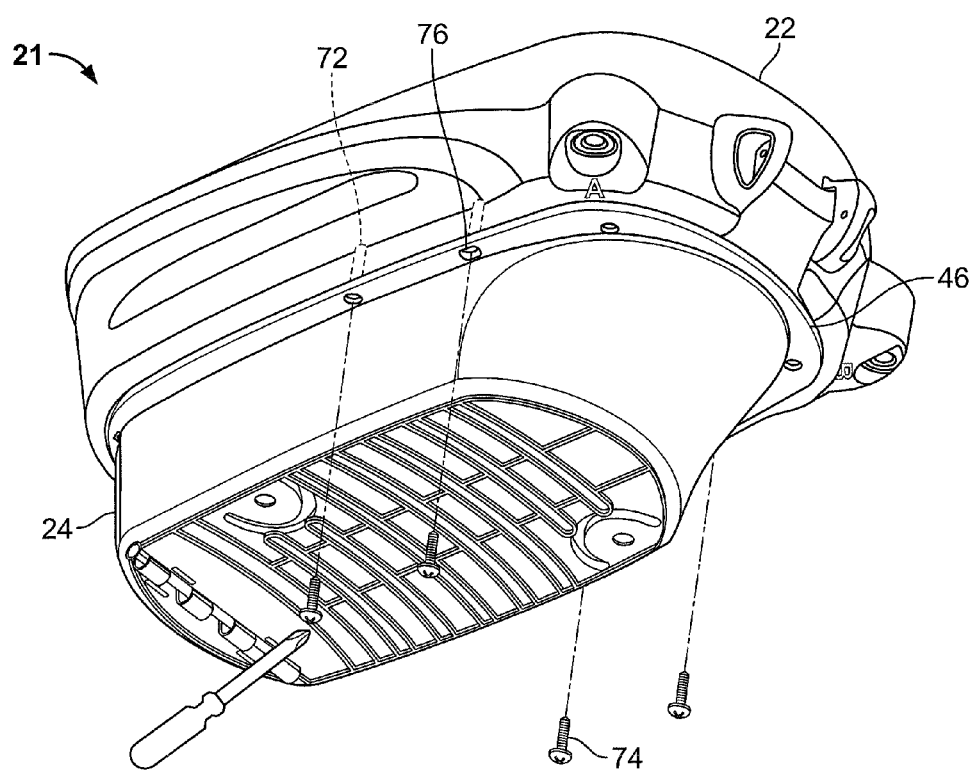
FIG. 8 is a bottom front perspective view of the wagon body of FIG. 6 in an assembled condition showing insertion of screws to further secure the wagon pan to the footwell.

As shown in FIG. 6, fasteners in the form of primary screws 54 are positioned through corresponding openings in the seat surfaces 32a and 32b of the wagon pan and engage the nuts 52 of the footwell. As a result, the footwell 24 is secured to the wagon pan 22, as illustrated in FIG. 8. Other fasteners known in the art may be used as alternatives to the primary screws.

Figure 9:
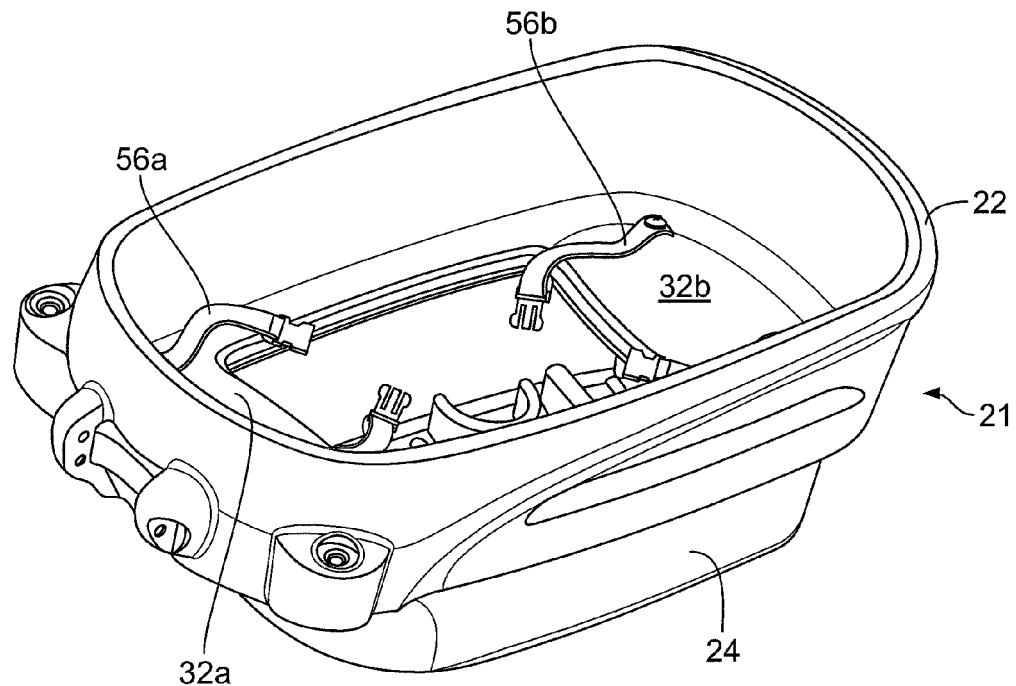
FIG. 9 is a top front perspective view of the assembled wagon body of FIG. 8.
Figure 11:
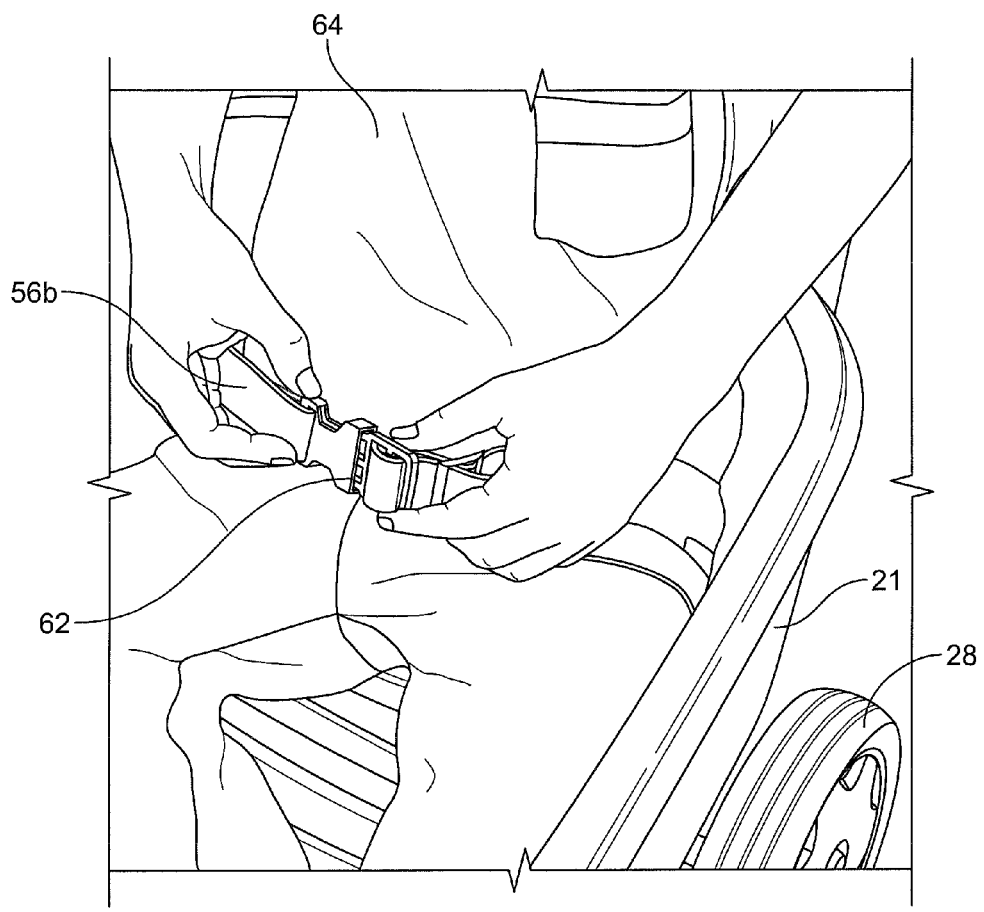
FIG. 11 is an enlarged perspective view of a rear portion of the wagon illustrating use of the seat belts of FIGS. 6 and 9.

As illustrated in FIGS. 6 and 9, seatbelts 56a and 56b are preferably secured by their proximal ends to the tops of seat surfaces 32a and 32b using the primary screws 54 (i.e. the same screws that secure the wagon pan and footwell together). Of course alternative fastener arrangements known in the art may be used to secure the seat belts to the wagon seat surfaces. As illustrated in FIG. 11, rear seatbelt 56b is provided with a quick release buckle 62 so that a child 64 riding in the wagon may easily fasten and unfasten the seatbelt. Seatbelt 56a is also provided with such a buckle.

Threaded inserts, illustrated in phantom at 72 in FIG. 8, are positioned and secured within the sidewalls of the wagon pan. The threaded inserts may be molded in place or inserted and secured in place, such as with threads, adhesive or another securing arrangement, after the wagon pan is constructed. Secondary screws, illustrated at 74 in FIG. 8, are inserted through corresponding openings 76 formed in the circumferential rim 46 of the footwell and engage the threaded inserts 72. As a result, the wagon pan and footwell are securely fastened together, as illustrated in FIG. 9.

Figure 12:
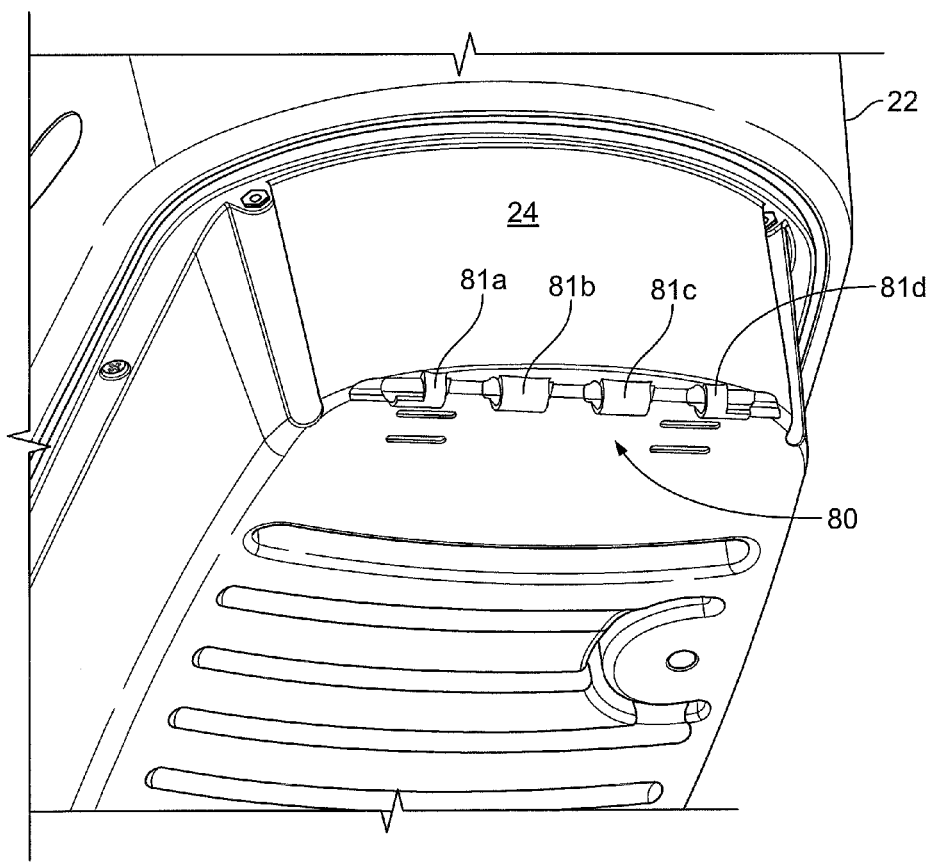
FIG. 12 is a bottom rear partial perspective view of the rear portion of the wagon body of FIGS. 6, 8 and 9 illustrating the molded rear axle mount prior to installation of the rear axle.
Figure 13:
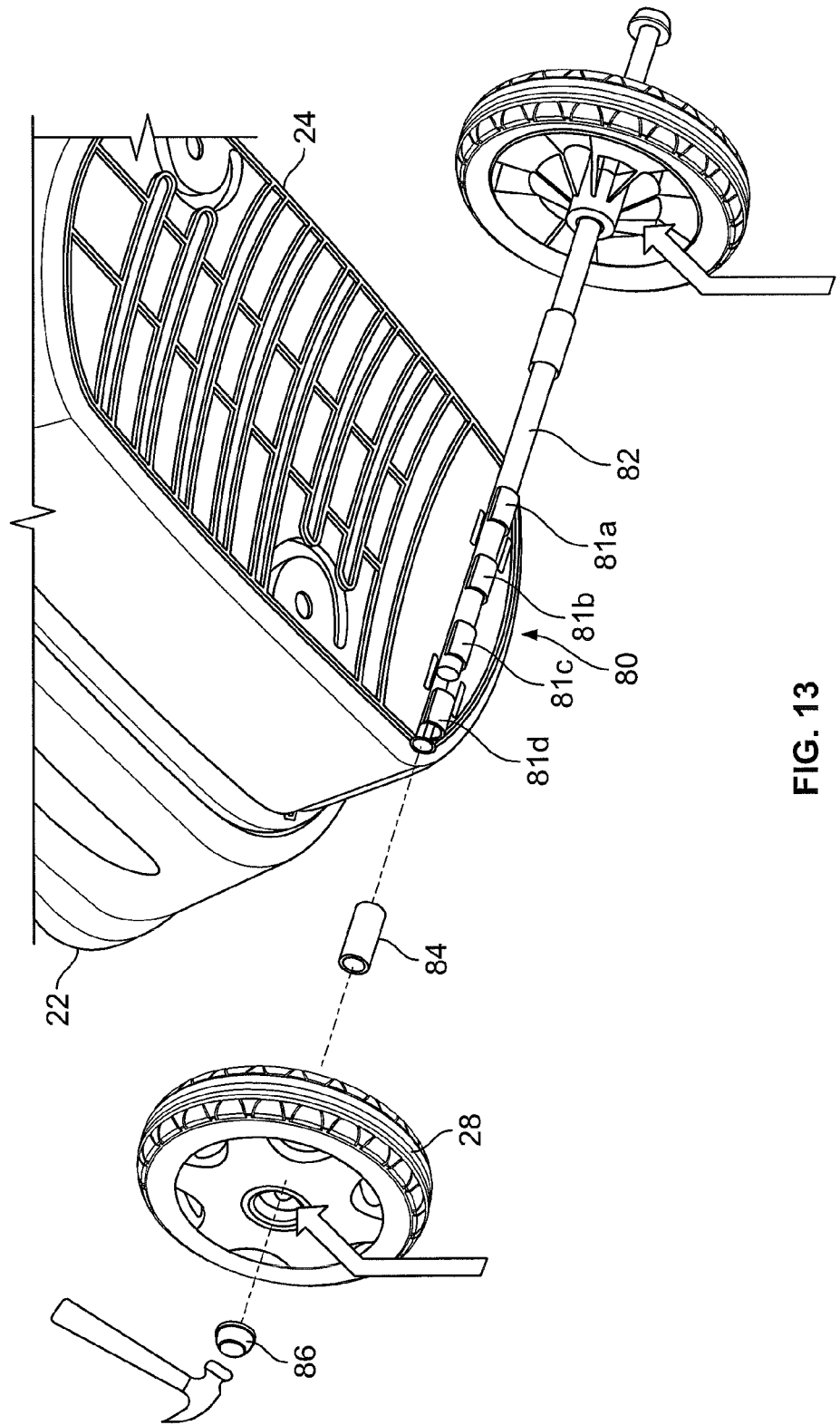
FIG. 13 is a bottom partial perspective exploded view illustrating assembly of the rear axle and wheels to the molded rear axle mount of FIG. 12.
Figure 14:
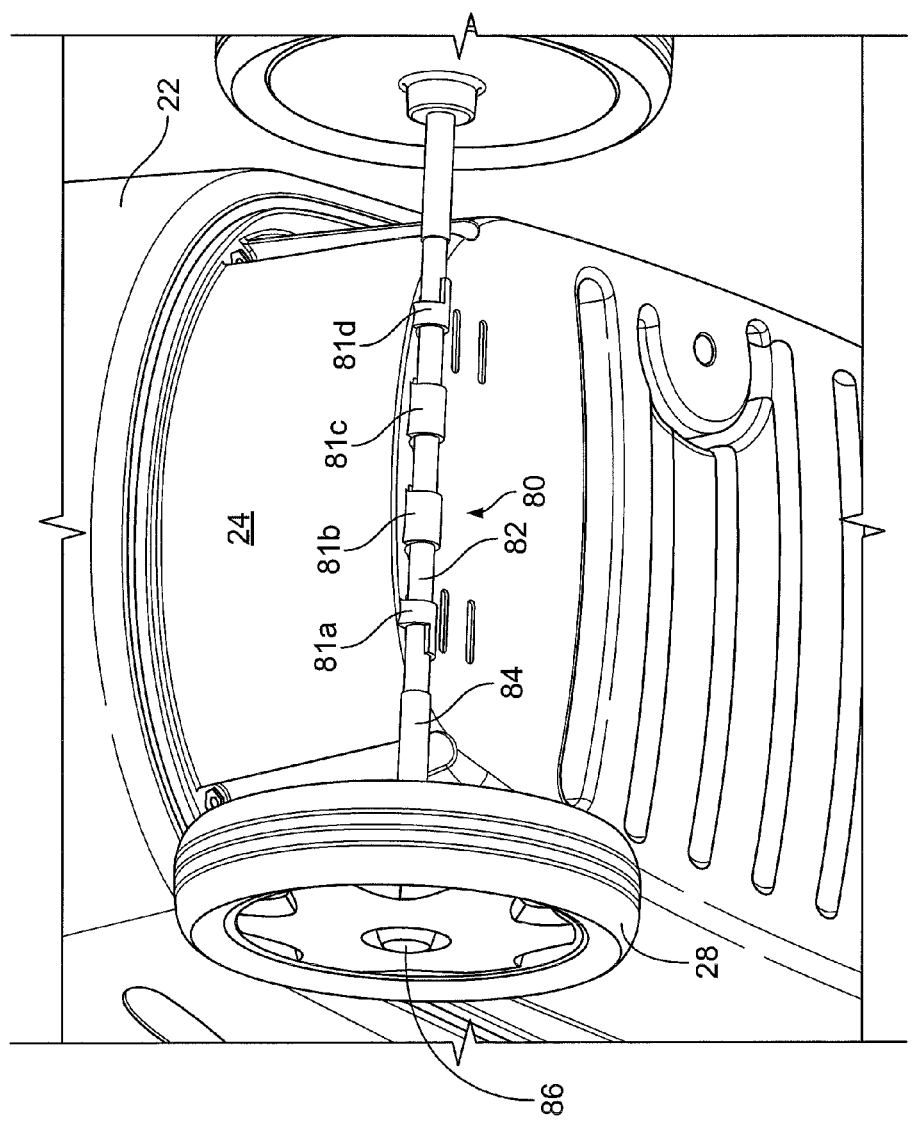
FIG. 14 is a bottom rear partial perspective view of the rear portion of the wagon body and axle mount of FIGS. 12 and 13 after installation of the rear axle and wheels.

As illustrated in FIG. 12, a rear axle mount, indicated in general at 80, is molded with the rear edge of the footwell 24. In alternative embodiments, the axle mount could take the form of openings formed through the footwell or an axle mount that is made separately from the footwell, out of plastic, metal or another material, and attached to the footwell. The axle mount features a number arcuate members 81*a*-81*d* that receive the rear axle 82 of the wagon, as illustrated in FIGS. 13 and 14. During assembly, the rear axle 82 is preferably moved through the arcuate members of the axle mount 80, as illustrated in FIG. 13. As shown in FIGS. 13 and 14, a pair of spacers 84 are preferably positioned on each end of the axle after installation to the rear axle mount 80. After the rear wheels 28 are mounted on the axles, a pair of end caps 86 are attached by interference fit with the ends of the rear axle.

Figure 15:
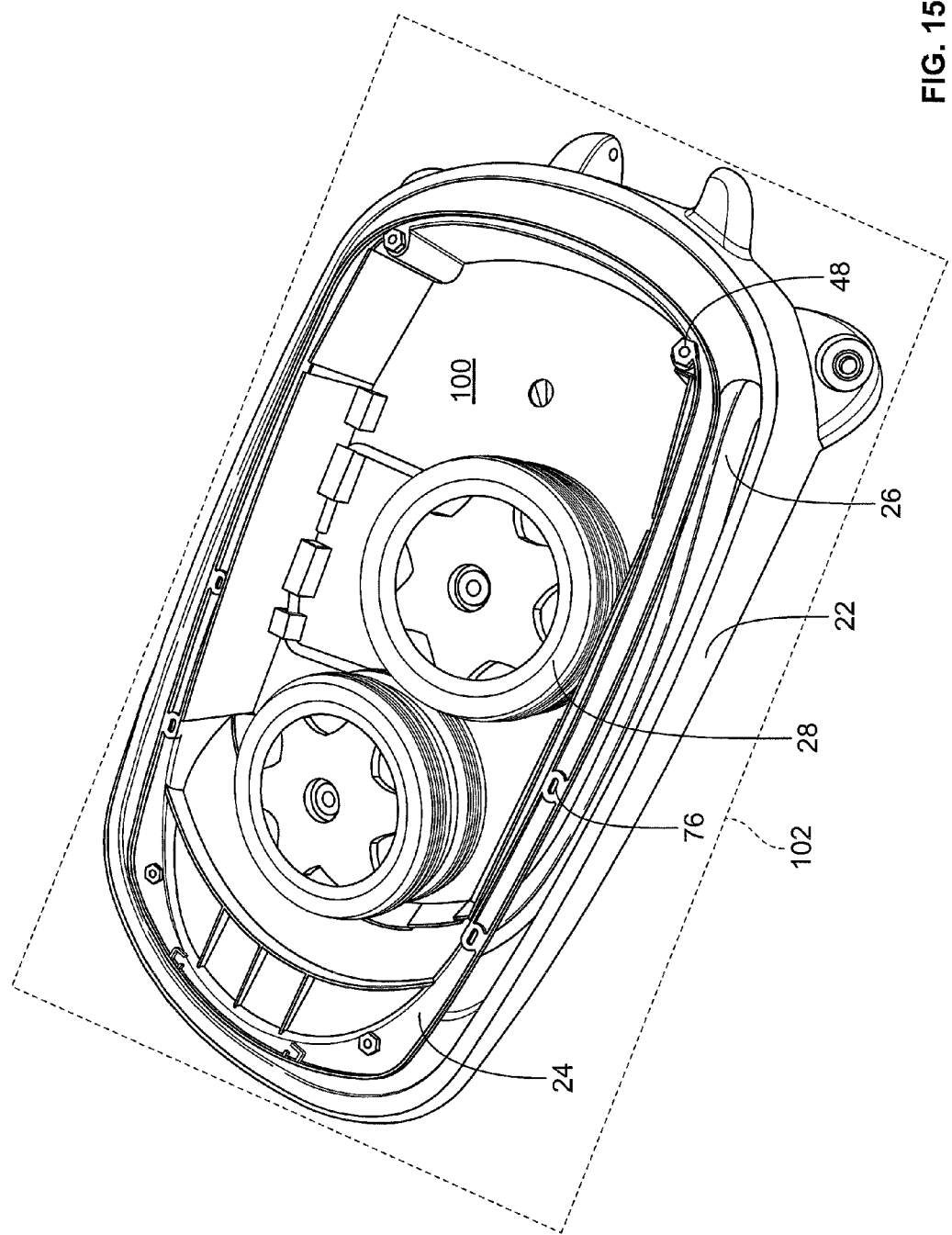
FIG. 15 is a top front perspective view of the wagon of FIGS. 1-14 in a disassembled and packaged configuration.

As illustrated in FIG. 15, the two-piece body and other construction details of the wagon of FIGS. 1-14 permits compact packaging and shipping in a nested configuration where the footwell 24 is positioned within the wagon pan 22, and then the handle 16, wagon wheels 28 and associated components are positioned within the footwell. A cardboard insert 100 preferably holds the wheels and other components in place within the footwell. The compact nested assembly of FIG. 15 may then be packaged within a box, indicated in FIG. 15 by dashed lines 102.

The wagon of FIGS. 1-15 provides a compact packaging and shipping profile and is inexpensive to produce. Furthermore, the wagon is lightweight and durable when assembled.

While the preferred embodiments of the invention have been shown and described, it will be apparent to those skilled in the art that changes and modifications may be made therein without departing from the spirit of the invention, the scope of which is defined by the appended claims.

What is claimed is:

1. A wagon comprising:
   a. a wagon pan including a wagon pan sidewall and a bottom;
   b. a footwell including a footwell sidewall and a bottom;
   c. said wagon pan and footwell adapted to be shipped in a nesting configuration, wherein the footwell is positioned within the wagon pan with the bottom of the footwall positioned adjacent the bottom of the wagon pan, and wherein the wagon pan and the footwell are also adapted to be fastened together with the wagon pan on top of the footwell to form a body; and
   d. a plurality of wheels adapted to be connected to the body, the wheels further being sized and shaped to be positioned in the footwell for shipping.

2. The wagon of claim 1 further comprising as handle adapted to be pivotally attached to the wagon body.

3. A wagon comprising, a wagon pan having a sidewall, a footwell having as footwell sidewall and a bottom, the footwell adapted to be positioned at least partially within the wagon pan in a first position for shipping, and the wagon pan and the footwell also adapted to be fastened together with the wagon pan on top of the footwell to form a body, a plurality of wheels adapted to the connected to the body, and wherein the wagon pan is constructed from rotationally molded plastic and the footwell is constructed of injection molded plastic.

4. The wagon of claim 1 wherein the wagon pan includes a seat.

5. The wagon of claim 1 wherein the footwell includes a cup holder.

6. The wagon of claim 1 wherein the footwell includes a barrier wall.

7. The wagon of claim 1 further comprising a primary screw and wherein the wagon pan includes a circumferential rim portion that is adapted to be engaged by the primary screw.

8. The wagon of claim 7 further comprising a nut and wherein the circumferential rim portion includes a nut recess containing the nut where the nut is adapted to engage the primary screw.

9. The wagon of claim 7 further comprising a secondary screw and the wagon pan includes an insert that is adapted to be engaged by the secondary screw.

10. The wagon of claim 1 wherein the wagon pan features a pair of caster mounts adapted to receive a front pair of the plurality of wheels.

11. The wagon of claim 1 wherein the wagon pan features handle mounting brackets and further comprising a handle adapted to be pivotally attached to the handle mounting brackets.

12. A wagon comprising:
   a. a body including a wagon pan and a footwell where the wagon pan is formed independent of the footwell and fastened on top of the footwell using fasteners, said wagon pan including a wagon pan sidewall and said footwell including a footwell sidewall and a bottom, wherein the footwell has a rear axle mount;
   b. a plurality of wheels attached to the body, and a rear axle engaging the rear axle mount with a pair of the plurality of wheels mounted on the rear axle; and
   c. a handle pivotally attached to the body.

13. The wagon of claim 12 wherein the wagon pan includes a seat.

14. The wagon of claim 13 wherein the footwell includes a harrier wall so that a storage space is defined under the seat.

15. The wagon of claim 12 wherein the footwell includes a cup holder.

16. The wagon of claim 12 wherein the fasteners include a primary screw and wherein the wagon pan includes a circumferential rim portion wherein the circumferential rim portion includes a nut recess containing the nut where the nut is adapted to engage the primary screw.

17. The wagon of claim 16 wherein the fasteners further include a secondary screw and the wagon pan includes an insert that is adapted to be engaged by the secondary screw.

18. The wagon of claim 12 wherein the wagon pan features a pair of caster mounts that pivotally receive a front pair of the plurality of wheels.

19. The wagon of claim 12 wherein the wagon pan features handle mounting brackets that pivotally receive the handle.

20. The wagon of claim 12 wherein the wagon pan includes a seat and further comprising a seat belt connected to the wagon body.

21. The wagon of claim 20 wherein the rear axle mount includes arcuate members molded into the footwell.

22. A method for constructing a wagon comprising the steps of:
   a. receiving a wagon pan having, a sidewall;
   b. receiving a footwell having a sidewall and a bottom;
   c. receiving a plurality of wheels;

d. attaching the wagon pan to the footwell using screws to form a body of the wagon; and
e. attaching the plurality of wheels to the body.

23. The method of claim 22 further comprising the steps of:
f. receiving a handle;
g. pivotally attaching the handle to the body.

24. The method of claim 22 wherein a rear axle is positioned through a rear axle mount of the footwell and a rear pair of the plurality of wheels are positioned on the rear axle.

25. The method of claim 22 wherein a rear axle is positioned through a rear axle mount of the footwell and a rear pair of the plurality of wheels are positioned on the rear axle.

26. A wagon comprising:
a wagon pan having a wagon pan sidewall and a pair of front wheel mounts extending from the sidewall;
a separate footwell having a footwell sidewall and a bottom, the footwell having a rear axle mount, wherein the wagon pan and the footwell are adapted to be fastened together with the wagon part on top of the footwell to form a body; and,
a first pair of wheels adapted to be connected to the front wheel mounts and a second pair of wheels adapted to be positioned on a rear axle connected to the rear axle mount.

27. A wagon comprising:
a wagon pan having a wagon pan sidewall and a seat extending from the sidewall;
a separate footwell having a footwell sidewall and a bottom, wherein the wagon pan and the footwell are adapted to be nested together in a first position with the footwell bottom adjacent the seat of the wagon pan, and wherein the wagon pan and the footwell are adapted to be fastened together in a second position with the wagon pan on top of the footwell to form a body; and,
a plurality of wheels adapted to be connected to the body.

* * * * *